United States Patent [19]

Cysewski

[11] Patent Number: 4,490,968

[45] Date of Patent: Jan. 1, 1985

[54] BALING APPARATUS

[76] Inventor: Jerome M. Cysewski, 2011 Harnish Blvd., P.O. Box 1998, Billings, Mont. 59103

[21] Appl. No.: 535,383

[22] Filed: Sep. 23, 1983

[51] Int. Cl.³ .................. A01D 39/00; A01D 59/00; A01D 78/14

[52] U.S. Cl. .................................. 56/341; 56/343; 100/81

[58] Field of Search .................. 56/341, 343; 100/80, 100/81

[56] References Cited

U.S. PATENT DOCUMENTS

| 654,970 | 7/1900 | Gooch | 100/81 |
|---|---|---|---|
| 932,354 | 8/1909 | Thomas | 100/81 |
| 971,951 | 10/1910 | Wood | 100/81 |
| 1,079,683 | 11/1913 | Wood | 100/80 |
| 3,868,809 | 3/1975 | Bledsoe | 100/80 |
| 4,175,487 | 11/1979 | Molitorisz | 100/8 |
| 4,270,446 | 6/1981 | Molitorisz | 100/8 |
| 4,302,923 | 12/1981 | Molitorisz | 56/341 |

FOREIGN PATENT DOCUMENTS 967376  10/1982  U.S.S.R. ................. 56/341

Primary Examiner—Paul J. Hirsch
Attorney, Agent, or Firm—Arthur L. Urban

[57] ABSTRACT

Baling apparatus including a support portion including a carriage section with a base section, a pair of upstanding sections and a hitch section; a forage pickup portion including a generally cylindrical rake rotatably disposed below the base section on a transverse horizontal shaft; a bale forming portion including a substantially rectangular chamber pivotally connected between the upstanding sections, a bale compressor slidably disposed transversely within the chamber and movably supported at each of its corners, pairs of arm members extending longitudinally of the base section in opposite directions from the chamber adjacent the lower end thereof, a pair of the arm members remote from the hitch section being pivotally connected to the chamber, a supporting member extending between the free ends of each pair of arm members, a pair of spaced drums rotatably disposed transversely of the base section above the forage pickup portion, a plurality of closely spaced flexible longitudinal strips extending between each of the supporting members and the rotatable drum closest thereto; a bale tying portion including a plurality of knotters movably supported on the base section adjacent the end thereof remote from the hitch section, a plurality of movable arcuate needles corresponding in number to the knotters, a twine tensioner disposed adjacent the knotters including a rod member mounted on pivotable supports extending upwardly from the base section; a bale discharging portion including a releasable retainer mounted on the chamber adjacent the free ends of pivotable arm members, an inclined section pivotally connected to the support portion, a control portion including hydraulic drives and hydraulic cylinders.

12 Claims, 7 Drawing Figures

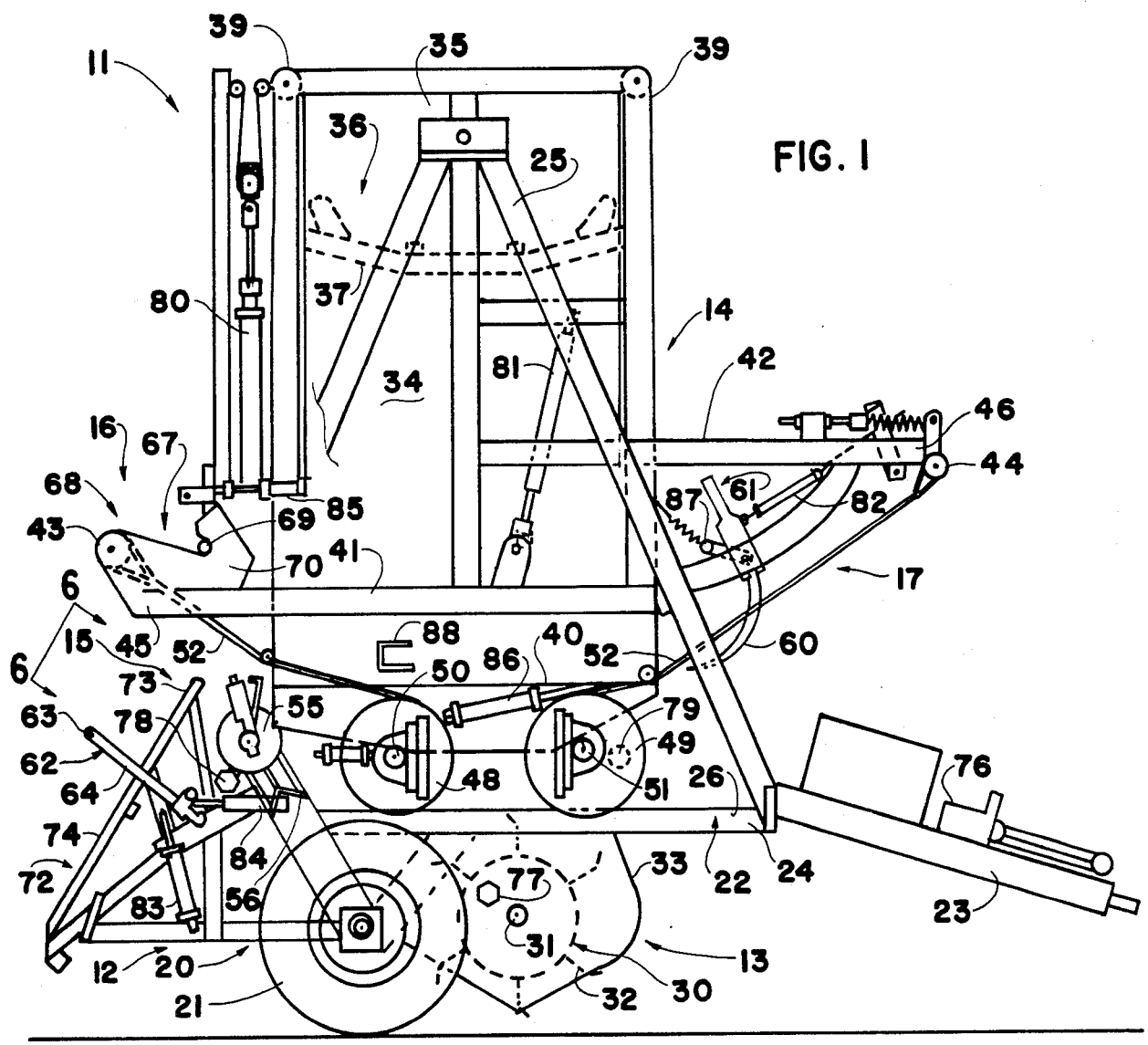
FIG. 1
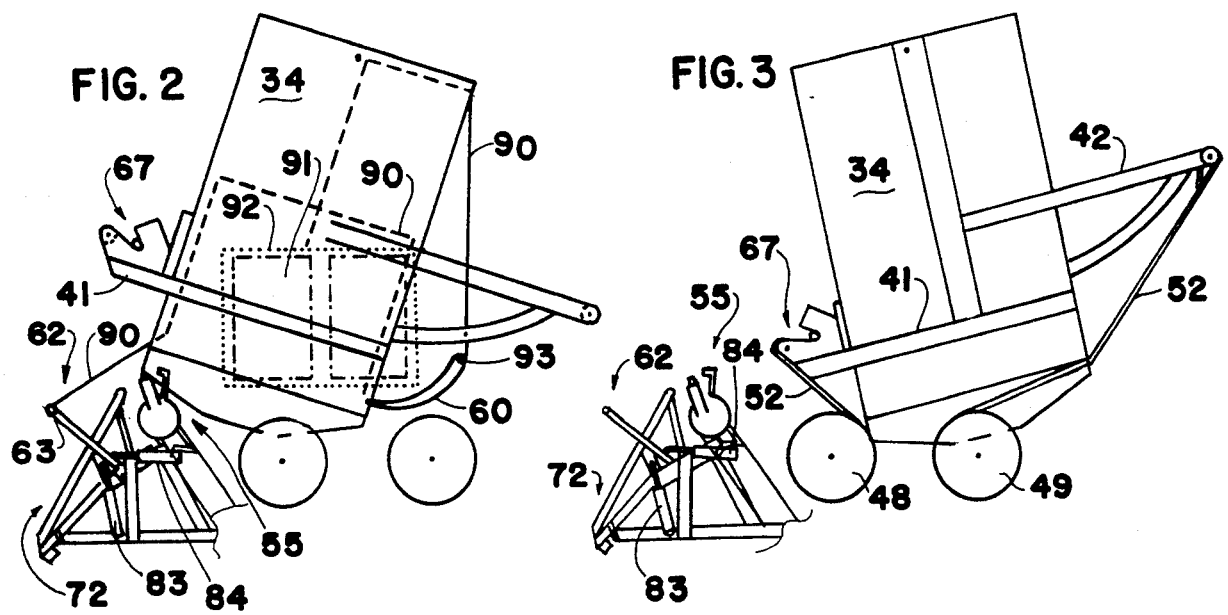
FIG. 2
FIG. 3

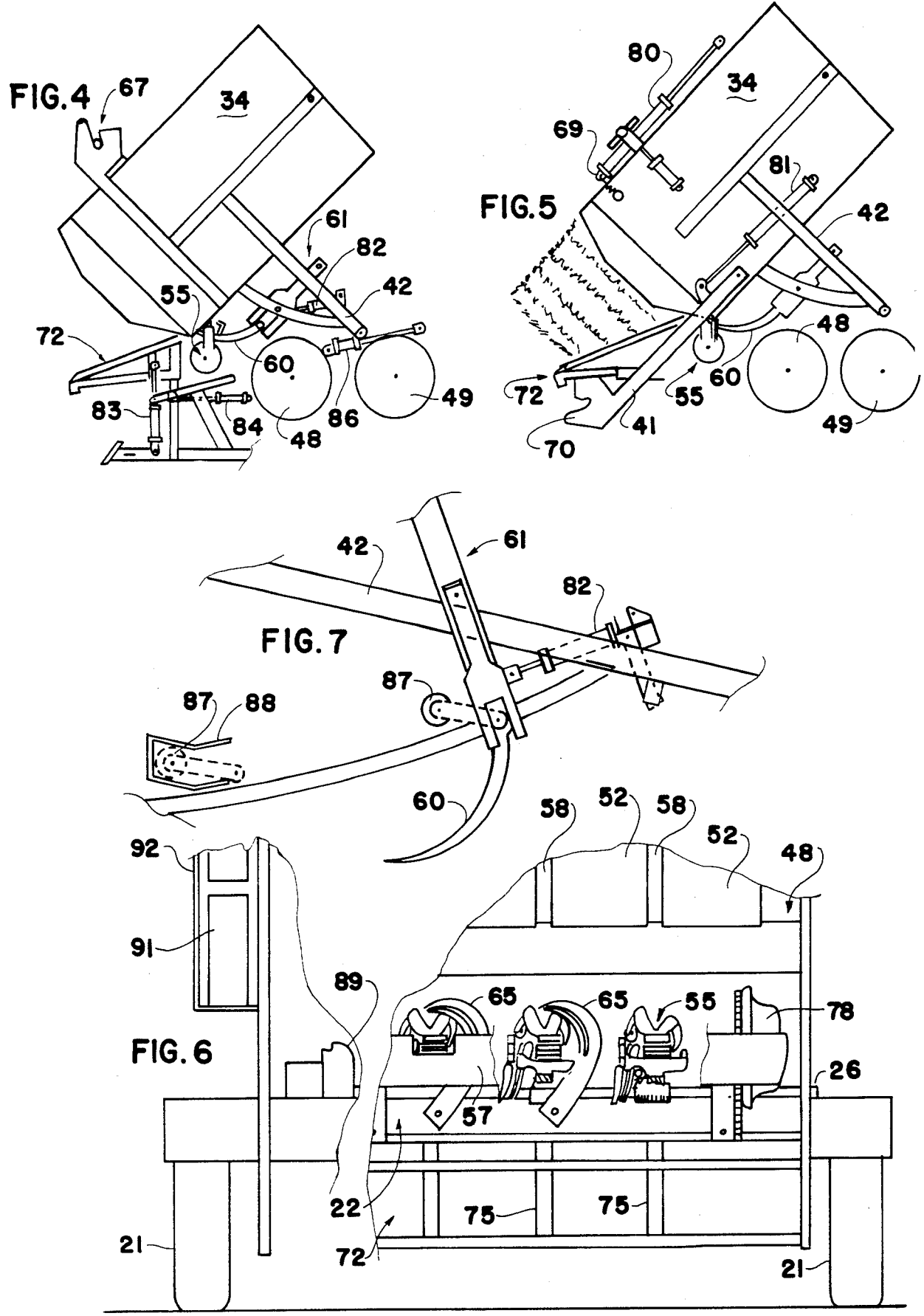

BALING APPARATUS

This invention relates to a novel baling apparatus and more particularly relates to a new apparatus for baling hay and other forage material.

Many years ago, cut hay and other forage crops were gathered into stacks for storage prior to use as animal feed. While this method was satisfactory when farm labor was readily available and cheap, difficulties in obtaining farm laborers and the high cost of such labor have seen the demise of loose haystacks in recent years.

A variety of solutions have been proposed for reducing the amount of labor required for gathering and storing hay. These proposals frequently have involved the mechanical compression of hay into bales of one shape or another. The use of this type of machinery for baling hay has resulted in a significant reduction in the hand labor previously required for such operations.

Hay often is baled into rectangular bales having a size of about one foot by one and one-half feet by three feet. These bales then are stacked in crossed layers with the bales in one layer having their long dimension at right angles to the long dimension of bales in adjacent layers. Although machinery has been developed to stack rectangular bales, most farmers and ranchers still utilize considerable hand labor with such small bales to achieve the desired tight straight stacking of the bales.

With the continually increasing difficulties in obtaining and paying for farm labor, there have been further efforts to develop hay handling methods that can achieve additional reductions in the amount of hand labor required for such operations. One proposal that has received a considerable degree of acceptance has been the baling of hay into large round bales. These bales may be as large as six feet or more in diameter and weigh more than 1,000 pounds.

Round bales have a number of advantages over conventional small rectangular bales. Round bales can be gathered from the field and stacked easily by one person with a tractor. A tractor can be equipped with a spear-like projection or a fork lift attachment and the bale lifted off the ground and moved to a desired position. Since a half ton or more of hay can be handled in one operation, a large quantity of hay can be gathered and stacked in a short time by a single tractor operator.

Although round halves have advantages over previous baling methods, they are not without their own problems. One is the storage of the bales. Since the bales are round, the bales cannot be arranged into a dense compact stack. Generally, such bales are stacked on their sides with their axes transverse to the stack. Successive layers are placed on top of each other with the bales in one layer offset from the bales in adjacent lower and upper layers. This stacking configuration minimizes to some extent the open areas within the stack.

Another disadvantage of round bales is the difficulty encountered in feeding such a bale. Since the bales are giant tightly wound rolls, special equipment is required for the unrolling and dispensing of the hay.

In an attempt to overcome the shortcomings of small rectangular bales and also those of large round bales, it has been prposed to form large rectangular bales. Such bales could be stacked into conventional rectangular stacks with a minimum of open areas. Also, such bales would provide economical and efficient handling.

While various methods and machinery have been proposed to form large rectangular bales, such bales have not gained significant acceptance. This is because of the previous inability to produce a satisfactory bale and also the difficulties with the complicated machinery proposed for the baling. With some systems, the hay was very tightly baled. This required a high level of power to provide the desired compression. Also, the tightness of the bales significantly increased molding of the hay.

U.S. Pat. Nos. 4,270,446 and 4,302,923 also describe a method and machinery for producing large rectangular bales. As stated in the patents, one objective is to provide an efficient and simple apparatus requiring low power consumption. The apparatus employs a feeder-compactor that picks up the cut hay from the ground and passes it to a chamber disposed above the feeder. Either the feeder, the chamber or both are oscillated back and forth to deposit the hay into the bottom intake of the chamber in a continuous folded ribbon. Compression of the hay within the chamber is said to be achieved exclusively through the weight of the hay in the chamber as it moves upwardly. One of the advantages of the method is stated to be that no mechanical compression is required.

When a full bale has been produced, it is tied together with twine or wire which is automatically installed by a tying mechanism adapted from conventional bale making machines such as tying mechanisms used on 336 series bales manufactured by John Deere Company.

Although this John Deere machinery is designed for the baling of conventional small rectangular bales, the patents do not include any disclosure of how such tying mechanisms can be adapted for the large rectangular bales produced with the specific machinery of the patents.

It may appear from the description in the patents that the baling apparatus thereof has advantages over methods and apparatus previously proposed. However, equipment constructed in accordance with the disclosures in the patents fails to provide satisfactory results, the bales produced are not sufficiently dense. Also, the tying mechanism does not provide a tight bale.

In an attempt to overcome the problems encountered with the apparatus described in the patents, a movable platen was added to the bale forming chamber to compress the hay therein. The platen rested on the top of the hay in the chamber. However, the platen produced distortion of the top of the bale so that it was not parallel to the bottom surface and perpendicular to the side surfaces. This condition rendered the bales completely unacceptable.

Also, the tying mechanism was moved from the main support frame to the oscillating chamber assembly. This arrangement caused the tying mechanism to move back and forth with the chamber during the bale forming operation.

While the repositioning of the typing mechanism reduced the slack in the twine during the bale formation, a significant amount of slack still was created as the needles moved into position for tying. The slack allowed the bale to expand to such an extent that the bale could not be handled properly.

The added weight of the tying mechanism gave the baler a jerking motion. Also, to position the tying mechanism for tying, the chamber had to be moved all the way forward out of the way, allowing hay to drop from the chamber which caused the tying mechanism to malfunction.

From the above discussion, it is clear that past hay baling systems do not provide the desired combination of efficient baling, handling and feeding. Thus, there is a need for a new baling apparatus which overcomes the deficiencies of previous systems.

The present invention provides a novel baling apparatus with advantages not found in past systems. The baling apparatus of the invention enables a single operator to bale a large hay acreage in a short period of time. The bales formed with the apparatus of the invention can be handled, stacked and fed quickly and efficiently in a minimum space.

The baling apparatus of the present invention is relatively simple in design and inexpensive as compared with past large baling machines. The apparatus can be produced from commercially available materials and components. Conventional farm equipment manufacturing techniques and procedures and semi-skilled labor can be employed in the fabrication of the apparatus. The apparatus is durable in construction and has a long useful life. Little maintenance is required to keep the apparatus in working condition.

The baling apparatus of the invention can be operated efficiently by farmers or hired hands after only a minimum of instruction. Since the power requirements of the apparatus are relatively low, it can be operated with normal size tractors. The baling apparatus can operate successfully both on level ground and on rolling land.

Bales produced with the new baling apparatus of the invention have good structural integrity and can be handled with conventional loading equipment without damage to or destruction of the bale. The bales can be stacked into tight stacks without open areas.

The bales formed with the apparatus can be fed to animals simply and conveniently. For example, a bale can be placed into the bed of a pickup and hay thrown onto the ground as the pickup is moved forward in the same way as for loose hay or small rectangular bales. Special equipment is not required for the feeding.

In addition to the above advantages of the baling apparatus of the present invention, the baled hay produced also is superior to conventional hay bales. The hay is high in protein and very nutritious. The hay has a higher proportion of leaves and a minimum of cut ends. Thus, hay baled with the apparatus of the invention is more easily digested.

These and other benefits and advantages of the novel baling apparatus of the present invention will be apparent from the following description and the accompanying drawings in which:

FIG. 1 is a side elevation partially in section of one form of the baling apparatus of the invention;

FIG. 2 is a fragmentary side view partially in section of the bale forming portion of the baling apparatus shown in FIG. 1 at one end of the baling cycle;

FIG. 3 is a fragmentary side view of the bale forming portion shown in FIG. 3 at the opposite end of the baling cycle;

FIG. 4 is a fragmentary side view partially in section of the baling apparatus shown in FIG. 1 in a bale tying position;

FIG. 5 is a side view of the baling apparatus shown in FIG. 4 disposed in a bale discharging position;

FIG. 6 is a fragmentary right end view of the baling apparatus shown in FIG. 1 taken along line 6—6 thereof; and FIG. 7 is an enlarged fragmentary side view of the needle portion of the baling apparatus shown in FIG. 1.

As shown in the drawings, one form of the novel baling apparatus 11 of the present invention includes a support portion 12, a forage pickup portion 13, a bale forming portion 14, a bale tying portion 15, a bale discharging portion 16 and a control portion 17.

The support portion 12 of the baling apparatus 11 of the present invention includes a carriage section 20 with wheel members 21. A base section 22 is carried by the carriage section 20. A hitch section 23 extends from one end 24 of the base section 22. In this way, the baling apparatus can be towed with a suitable vehicle such as a tractor or pickup (not shown).

The support portion 12 also includes a pair of upstanding sections 25 that extend upwardly adjacent opposed side edges 26 of the base section 22. Advantageously, the upstanding sections 25 have a generally triangular configuration.

The forage pickup portion 13 of the baling apparatus 11 of the invention includes generally cylindrical rake means 30. The rake means is disposed below the base section 22 of the support portion 12. The rake means 30 is rotatably supported on a substantially horizontal shaft 31 that is disposed transversely of the base section, that is, transversely of the longitudinal axis of the apparatus. The rake means preferably includes a plurality of radial finger members 32 and an enclosure 33 around a part of the periphery thereof.

The bale forming portion 14 of the baling apparatus 11 includes a substantially rectangular chamber 34. The upper end 35 of the chamber is pivotally connected between the upstanding sections 25 of the support portion 12. The chamber 34 advantageously has a height substantially greater than the cross section dimensions thereof.

The bale forming portion 14 includes bale compressing means 36 disposed within the chamber 34. The bale compressing means 36 includes a closure member 37 that is slidably disposed transversely of the chamber. The compressing member 37 is movably supported at each of its corners 38. Preferably, this support is achieved through chain and sprocket combinations 39.

As part of the bale forming portion, pairs of arm members 41 and 42 extend longitudinally of the base section 22. The pairs of arm members extend in opposite directions from the chamber 34 adjacent the lower end 40 thereof. One pair of the arm members 41 that is remote from the hitch section 23 is pivotally connected to the chamber. The other pair of arm members 42 that extends toward the hitch section is fixed to the chamber. Supporting members 43 and 44 extend between the free ends 45 and 46 of arm members 41 and 42 respectively.

Drums 48 and 49 are rotatably carried by horizontal shafts 50 and 51. The shafts are disposed transversely of the base section 22. The drums 48 and 49 are spaced from one another and located above the forage pickup portion 13.

A plurality of flexible longitudinal strips 52 extend between each support member and the rotatable drum closest thereto. Thus, strips 52 extend between supporting member 43 and drum 48, while additional strips extend between supporting member 44 and drum 49. The strips of each assembly are closely spaced but separated from adjacent strips. The ends of each strip are affixed to the respective supporting member and drum. The strips advantageously are rubber belting.

The bale tying portion 15 of the apparatus 11 includes a plurality of knotting means 55. The knotting means are supported for movement with respect to the base section 22. The knotters 55 are located adjacent the end 56 of the base section remote from the hitch section 23. The knotters may be mounted on a bar assembly 57 that is pivotable with respect to the base section. One knotter is disposed below each of the spaces 58 between adjacent longitudinal strips 52. The knotters and the needles described hereafter may be of the type manufactured by Rasspie.

The bale tying portion 15 includes a plurality of movable arcuate needles 60. The number of needles corresponds to the number of knotting means 55. The needles extend from supporting means 61 disposed between the pair of fixed arm members 42 extending from the chamber 34 toward the hitch section 23. The needles 60 are disposed parallel to each other and are aligned with the spaces between the longitudinal strips 52.

The bale tying portion includes twine tensioning means 62. The tensioning means 62 is disposed adjacent the knotting means 55. The tensioning means includes a rod member 63 that is carried by pivotable supports 64 extending upwardly from the base section 22. Advantageously, the bale forming portion also includes pivotable finger means 65 that are disposed adjacent each of the knotting means 55. These finger means pull the twine into the knotters.

The bale discharging portion 16 of the baling apparatus 11 includes releasable retaining means 67. The retaining means is mounted on the chamber 34 adjacent the free ends 45 of the pivotable arm members 41. As shown, the retaining means preferably may include latch means 68 including a pin 69 and hook 70 combination.

The bale discharging portion 16 further includes an inclined section 72 that is pivotally connected to the support portion 12. The inclined section 72 includes an upper end 73 that is disposed adjacent to the knotters 55. Advantageously, the inclined section includes an inclined surface 74 formed of spaced bars 75.

The control portion 17 of the baling apparatus 11 includes a hydraulic pump 76 and drive means such as hydraulic motors. Motor 77 drives rotatable rake means 30, motor 78 drives knotters 55 and a reversible motor 79 drives the drums 48 and 49.

The control portion also includes hydraulic cylinder means to effect movement of various components of the apparatus. Thus, hydraulic cylinder 80 provides movement of bale compressing means 36, cylinder 81 pivots arm members 41 and cylinder 82 is for the needle support 61. Similarly, cylinder 83 pivots knotters 55 and inclined section 72, cylinder 84 moves tensioning means 62 out of the way, cylinder 85 is for the retaining means 67 and cylinder 86 holds the chamber during tying. In place of a single cylinder, it may be desirable to utilize two or more cylinders to facilitate movement without binding. Additional cylinders may be employed for other functions such as brakes, etc.

In the use of the baling apparatus of the present invention as shown in the drawings, a towing vehicle (not shown) is attached to the apparatus through hitch section 23. Also, the control portion 17 is connected to the vehicle through suitable power take-off and electrical connections (not shown). The apparatus now is ready for use.

The baling apparatus 11 is towed through a field in which hay has been cut and collected into windrows. As the apparatus moves forward, the operator actuates controls (not shown) in his vehicle to activate pickup rake means 30 through motor 77. Rotation of rake 30 lifts hay into the space between the rotating drums 48 and 49 being driven by motor 79. With the drums rotating in the same direction, a swinging motion of the bale forming portion 14 is produced. This is accomplished by winding one set of strips 52 onto one drum 48 and a second set of strips off the other drum 49 simultaneously. That action causes the bale forming portion 14 and the chamber 34 to swing in an arc about pivotal connection 88 as shown in FIGS. 2 and 3 of the drawings.

The hay picked up by rake 30 and placed between the drums 48 and 49 is collected in the bottom of the chamber 34. As additional hay enters the bottom of the chamber, it forces the hay already present therein upwardly. This sequence is continued as the quantity of hay increases within the chamber. During this filling operation, the closure member 37 rests on the hay, compressing downwardly to increase the density of the hay in the chamber.

When the hay has filled the chamber 34, the operator of the towing vehicle activates suitable controls (not shown) to shut off the pickup rake 30. Then, the tying mode controls are actuated. This causes cylinder 84 to move the tension means 62 away from the knotters 55. Also cylinder 83 moves the knotting means into position for tying. Simultaneously, the cylinder 82 advances the bank of needles 60 into the knotters 55 and cylinder 86 which holds the chamber 34 in the tying position. Roller 87 of needle support 61 engages a stop 88.

The tying controls then are actuated to activate knotters 55. As motor 78 drives the knotters, it also activates finger means 65 through a cam 89 to pivot and pull the twine 90 into the knotters.

When the tying step is completed and the twine cut, the operator activates other controls to initiate the discharge of the tied bale. This involves the unlatching of retaining means 67 through cylinder 85 and the pushing of arm members 41 into a depressed position as shown in FIG. 5 by cylinder 81. Cylinder 80 then is activated to push the bale compressing member 37 downwardly and thus forcing the bale from the chamber onto inclined section 72 which has been moved into position with cylinder 83 and onto the ground behind the apparatus.

The operator activates controls to return arm members 41 to a closed position and draw the strips attached thereto through supporting member 43 back into position for beginning a new bale in the chamber 34. At this point, baling is started again by the operator actuating controls to rotate the rake 30 and pick up hay from the ground. The hay is placed between rotating drums 48 and 49 which swing the chamber 34 back and forth as the drums reverse.

The path of the twine 90 through the baling apparatus 11 goes from a twine package 91 in side storage area 92 up the outside of chamber 34 and back down to the inlets 93 of needles 60. The twine emerging from the needles passes up one side, over the top and down the opposite side of the hay in the chamber and then around tensioning means 62 before reaching the knotters 55.

The apparatus 11 is towed over the field, repeating the above steps until all of the cut hay has been baled. Each time a bale is formed, tied and discharged onto the ground, and then a new bale is started.

The above description and the accompanying drawings show that the present invention provides a novel baling apparatus with benefits and advantages not found in previous systems. The baling apparatus of the invention allows a large acreage of cut hay to be baled into large rectangular bales by a single operator in a short period of time. The bales so produced have good structural integrity and can be handled with conventional handling equipment. The bales can be stacked into tight rectangular stacks without voids.

The baling apparatus of the invention can be fabricated from commercially available materials and components using normal farm equipment manufacturing techniques. The apparatus is durable in construction so downtime is minimized. Power requirements of the apparatus are low so conventional tractors or pickups can be utilized as the towing vehicle.

Hay baled with the apparatus of the invention is of especially high quality. A high proportion of leaves is retained in the bales. Also, cut ends are reduced to a minimum so the hay is easily digested. Feeding can be done from the back of a pickup without special feeding machinery.

It will be apparent that various modifications can be made in the particular baling apparatus described in detail and shown in the drawings within the scope of the invention. The size, configuration and arrangement of components can be changed to meet specific requirements. The placement of the drive motors and cylinders can be different. These and other changes can be made in the baling apparatus described provided the functioning and operation thereof are not adversely affected. Therefore, the scope of the invention is to be limited only by the following claims.

What is claimed is:

1. Baling apparatus including a support portion, a forage pickup portion, a bale forming portion, a bale tying portion, a bale discharging portion and a control portion; said support portion including a carriage section with wheel members, a base section, a pair of upstanding sections extending upwardly adjacent opposed side edges of said base section, a hitch section extending from one end of said base section; said forage pickup portion including generally cylindrical rake means disposed below said base section, said rake means being rotatably supported on a substantially horizontal shaft disposed transversely of said base section; said bale forming portion including a substantially rectangular chamber, the upper end of said chamber being pivotally connected between said upstanding sections of said support portion, bale compressing means disposed within said chamber, said compressing means including a closure member slidably disposed transversely of said chamber, said closure member being movably supported at each of its corners, pairs of arm members extending longitudinally of said base section in opposite directions from said chamber adjacent the lower end thereof, a pair of said arm members remote from said hitch section being pivotally connected to said chamber, a supporting member extending between the free ends of each pair of arm members, a pair of drums rotatably carried by horizontal shafts disposed transversely of said base section, said drums being spaced from one another above said forage pickup portion, a plurality of closely spaced flexible longitudinal strips extending between each of said supporting members and the rotatable drum closest thereto, opposite ends of said longitudinal strips being affixed to said supporting member and to said drum; said bale tying portion including a plurality of knotting means movably supported on said base section adjacent the end thereof remote from said hitch section, one of said knotting means being disposed below each of the spaces between adjacent longitudinal strips, a plurality of movable arcuate needles corresponding in number to said knotting means, said needles extending from supporting means disposed between the pair of arm members extending from said chamber toward said hitch section, said needles being disposed parallel to each other and aligned with the spaces between the longitudinal strips, twine tensioning means disposed adjacent said knotting means, said tensioning means including a rod member mounted on pivotable supports extending upwardly from said base section; said bale discharging portion including releasable retaining means mounted on said chamber adjacent the free ends of pivotable arm members, an inclined section pivotally connected to said support portion, said inclined section including an upper end disposed adjacent to said knotting means; said control portion including hydraulic drive means for said rotatable rake means and said knotting means and reversible drive means for said rotatable drums, hydraulic cylinder means for selectively changing the position of said bale compressing means, said pivotable arm members, said needle supporting means, said knotting means, said twine tensioning means, said inclined section and said retaining means.

2. Baling apparatus according to claim 1 wherein said upstanding sections have a generally triangular configuration.

3. Baling apparatus according to claim 1 wherein said chamber has a height substantially greater than the cross section thereof.

4. Baling apparatus according to claim 1 wherein said closure supporting means of said bale compressing means includes combinations of chains and sprockets adjacent each corner of said closure member.

5. Baling apparatus according to claim 1 wherein said flexible longitudinal strips include rubber belting.

6. Baling apparatus according to claim 1 wherein said bale tying portion includes pivotable finger means disposed adjacent each of said knotting means engageable with twine.

7. Baling apparatus according to claim 1 wherein said releasable retaining means of said bale discharging portion includes latch means.

8. Baling apparatus according to claim 1 wherein said control means includes separate hydraulic drive means or hydraulic cylinder means for each of said components.

9. Baling apparatus according to claim 1 including twine holding means disposed along one side edge of said base section.

10. Baling apparatus according to claim 1 wherein said knotting means is supported for movement toward said chamber during tying.

11. Baling apparatus according to claim 1 wherein said tensioning means is supported for movement to an inoperative position during tying.

12. Baling apparatus according to claim 1 wherein said control portion includes hydraulic cylinder means for holding said chamber close to said knotting means during tying.

* * * * *